US012572090B2

(12) United States Patent
Wang et al.

(10) Patent No.: US 12,572,090 B2

(45) Date of Patent: Mar. 10, 2026

(54) DEVELOPER CARTRIDGE

(71) Applicant: BROTHER KOGYO KABUSHIKI KAISHA, Nagoya (JP)

(72) Inventors: Yuwen Wang, Nagoya (JP); Kazuaki Ooka, Nagoya (JP); Isao Kishi, Nagoya (JP); Junichi Hashimoto, Toyohashi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/937,561

(22) Filed: Nov. 5, 2024

(65) Prior Publication Data

US 2025/0130517 A1 Apr. 24, 2025

Related U.S. Application Data

(63) Continuation of application No. 18/317,131, filed on May 15, 2023, now Pat. No. 12,174,557, which is a (Continued)

(30) Foreign Application Priority Data

Mar. 30, 2018 (JP) ................................ 2018-067897

(51) Int. Cl.

*G03G 15/08* (2006.01)
*G03G 21/16* (2006.01)
*G03G 21/18* (2006.01)

(52) U.S. Cl.

CPC ..... *G03G 15/0865* (2013.01); *G03G 15/0806* (2013.01); *G03G 21/1647* (2013.01); (Continued)

(58) Field of Classification Search

CPC ........... G03G 15/0865; G03G 15/0896; G03G 15/0806; G03G 21/1647; G03G 21/1676; (Continued)

(56) References Cited

U.S. PATENT DOCUMENTS 5,049,940 A 9/1991 Yamaguchi et al.
10,520,853 B2 12/2019 Wang et al.
(Continued)

FOREIGN PATENT DOCUMENTS

CN 101770193 A 7/2010
CN 102375377 A 3/2012
(Continued)

OTHER PUBLICATIONS

International Search Report and Written Opinion issued in related International Patent Application No. PCT/JP2018/036211, Dec. 25, 2018.

(Continued)

*Primary Examiner* — Sandra Brase

(74) *Attorney, Agent, or Firm* — Merchant & Gould P.C.

(57) ABSTRACT

A developing roller is located nearer a first end than a second end in a first direction. A first boss extends in a second direction and is movable together with a housing. The first boss bears the weight of a developer cartridge when the first boss is supported by a support surface of a first side plate of a drum unit, and is located away from the developing roller in the first direction and the third direction. A first pressure receiving surface is located farther away from the developing roller than the first boss in the third direction. The pressure receiving member receives a pressing force in the third direction from a pressing member of the first side plate of the drum unit. The first boss is located away from the developing roller in the first direction by a first distance. The first pressure receiving surface is located away from the developing roller in the first direction by the first distance or by a second distance smaller than the first distance.

11 Claims, 12 Drawing Sheets

Related U.S. Application Data continuation of application No. 17/579,778, filed on Jan. 20, 2022, now Pat. No. 11,693,331, which is a continuation of application No. 17/110,507, filed on Dec. 3, 2020, now Pat. No. 11,249,418, which is a continuation of application No. 16/680,803, filed on Nov. 12, 2019, now Pat. No. 10,859,942, which is a continuation of application No. 16/143,945, filed on Sep. 27, 2018, now Pat. No. 10,520,853.

(52) U.S. Cl.
CPC ..... *G03G 21/1671* (2013.01); *G03G 21/1676* (2013.01); *G03G 21/1821* (2013.01); *G03G 21/1825* (2013.01); *G03G 2221/1869* (2013.01)

(58) Field of Classification Search
CPC ........... G03G 21/1821; G03G 21/1671; G03G 21/1825; G03G 2221/1869
See application file for complete search history.

(56) References Cited

U.S. PATENT DOCUMENTS

| | | | |
|---|---|---|---|
| 10,859,942 | B2 | 12/2020 | Wang et al. |
| 11,249,418 | B2 | 2/2022 | Wang et al. |
| 11,693,331 | B2 | 7/2023 | Wang et al. |
| 2006/0245785 | A1 | 11/2006 | Kawamura et al. |
| 2007/0077086 | A1 | 4/2007 | Takakuwa et al. |
| 2007/0077087 | A1 | 4/2007 | Okabe et al. |
| 2007/0140725 | A1 | 6/2007 | Kamimura |
| 2007/0146311 | A1 | 6/2007 | Lin et al. |
| 2007/0147889 | A1 | 6/2007 | Kamimura |
| 2007/0280730 | A1 | 12/2007 | Okabe et al. |
| 2009/0074447 | A1 | 3/2009 | Choi et al. |
| 2009/0214269 | A1 | 8/2009 | Choi et al. |
| 2010/0135693 | A1 | 6/2010 | Okabe et al. |
| 2010/0166453 | A1 | 7/2010 | Okabe |
| 2011/0064457 | A1 | 3/2011 | Okabe et al. |
| 2011/0211867 | A1* | 9/2011 | Hashimoto ........ G03G 21/1676 399/119 |
| 2012/0163859 | A1 | 6/2012 | Hashimoto et al. |
| 2014/0003841 | A1 | 1/2014 | Kobayashi et al. |
| 2015/0023699 | A1 | 1/2015 | Kato |
| 2017/0097588 | A1 | 4/2017 | Fukamachi et al. |

FOREIGN PATENT DOCUMENTS

| | | | |
|---|---|---|---|
| CN | 111902776 | B | 1/2023 |
| EP | 0 381 401 | A2 | 8/1990 |
| EP | 1 768 001 | A2 | 3/2007 |
| JP | 2007-101635 | A | 4/2007 |
| JP | 2007-322554 | A | 12/2007 |
| JP | 2010-128336 | A | 6/2010 |
| JP | 2010-156790 | A | 7/2010 |
| JP | 2011-059510 | A | 3/2011 |
| JP | 2012-177850 | A | 9/2012 |
| JP | 2016-145906 | A | 8/2016 |

OTHER PUBLICATIONS

Extended European Search Report issued in related European Patent Application No. 18847229.4, Oct. 9, 2019.
Extended European Search Report issued in corresponding European Patent Application No. 20208924.9, Mar. 11, 2021.
Notice of Reasons for Refusal issued in corresponding Japanese Patent Application No. 2018-067897, mailed Feb. 22, 2022.
Office Action issued in corresponding Chinese Application No. 201880003652.7, mailed Jul. 15, 2022.
Office Action issued in corresponding Canadian Application No. 3092208, mailed Aug. 5, 2022.
Office Action issued in corresponding Chinese Patent Application No. 202211708988.8, Aug. 8, 2024.

* cited by examiner

DEVELOPER CARTRIDGE

CROSS-REFERENCE TO RELATED APPLICATION

This application is a continuation of U.S. patent application Ser. No. 18/317,131, filed May 15, 2023, which is a continuation of U.S. patent application Ser. No. 17/579,778, filed Jan. 20, 2022, now U.S. Pat. No. 11,693,331, which is a continuation of U.S. patent application Ser. No. 17/110,507 filed Dec. 3, 2020, now U.S. Pat. No. 11,249,418, which is a continuation of U.S. patent application Ser. No. 16/680,803, filed Nov. 12, 2019, now U.S. Pat. No. 10,859,942, which is a continuation of U.S. patent application Ser. No. 16/143,945, filed Sep. 27, 2018, now U.S. Pat. No. 10,520,853, which further claims priority from Japanese Patent Application No. 2018-067897 filed on Mar. 30, 2018. The contents of the aforementioned applications are incorporated herein by reference in their entirety.

TECHNICAL FIELD

Aspects of the disclosure relate to a developer cartridge.

BACKGROUND

Electrophotographic image forming apparatuses known in the art include laser printers and light-emitting diode (LED) printers. An image forming apparatus includes developer cartridges and a drum unit. The drum unit includes a plurality of photosensitive drums. The developer cartridges are removable from the drum unit. When a developer cartridge is attached to the drum unit, a developing roller of the developer cartridge contacts the corresponding photosensitive drum of the drum unit.

Each developer cartridge includes a developing roller shaft rotatable together with a developing roller. When the developer cartridge is attached to the drum unit, the developer cartridge rotates, due to weight of the developer cartridge, about the developing roller shaft relative to the drum unit. The developer cartridge is then positioned relative to the drum unit.

SUMMARY

When the developer cartridge is attached to the drum unit, the developer cartridge rotates about the developing roller shaft relative to the drum unit. The developing roller of the developer cartridge can apply greatly varying contact pressures to the photosensitive drum of the drum unit depending on the remaining amount of toner in the developer cartridge. Such greatly varying contact pressures between the developing roller and the photosensitive drum can cause inappropriate transfer of toner (white patches or color unevenness) onto a sheet on which images are output.

In response to the above issue, one or more aspects of the present invention are directed to a structure that prevents contact pressure between a photosensitive drum of a drum unit and a developing roller of a developer cartridge from varying greatly depending on the amount of toner remaining in the developer cartridge.

A first aspect of the disclosure provides a developer cartridge with the structure described below. The developer cartridge includes a housing, a developing roller, a first boss, and a pressure receiving surface. The housing extends in a first direction, and may contain toner. The housing has a first end in the first direction, and a second end located away from the first end in the first direction. The developing roller is rotatable about a roller axis extending in a second direction different from the first direction. The developing roller is located nearer the first end than the second end in the first direction. The developing roller has an uncovered surface located at a first end of the developing roller in a third direction and exposed outside the housing, and a covered surface located at a second end of the developing roller in the third direction inside the housing. The first boss extends in the second direction and is movable together with the housing. The first boss is located at a first outer surface of the housing at a first end of the housing in the second direction. The first boss may bear a weight of the developer cartridge when the first boss is supported by a support surface of a first side plate of a drum unit. The first boss is located away from the developing roller in the first direction and the third direction. The pressure receiving surface is located farther away from the developing roller than the first boss in the third direction. The pressure receiving member may receive a pressing force in the third direction from a pressing member of the first side plate of the drum unit. The first boss is located away from the developing roller in the first direction by a first distance. The pressure receiving surface is located away from the developing roller in the first direction by the first distance or by a second distance smaller than the first distance.

A second aspect of the disclosure provides a developer cartridge with the structure below. The developer cartridge includes a housing, a developing roller, a first boss, and a second boss. The housing extends in a first direction and may contain toner. The housing has a first end in the first direction, and a second end located away from the first end in the first direction. The developing roller is rotatable about a roller axis extending in a second direction different from the first direction. The developing roller is located nearer the first end than the second end in the first direction. The developing roller has an uncovered surface and a covered surface. The uncovered surface is located at a first end of the developing roller in a third direction and exposed outside the housing. The covered surface is located at a second end of the developing roller in the third direction inside the housing. The first boss extends in the second direction and is movable together with the housing. The first boss is located at a first outer surface of the housing at a first end of the housing in the second direction. The first boss is located away from the developing roller in the first direction and the third direction. The second boss extends in the second direction and is movable together with the housing. The second boss is located at the first outer surface. The second boss is located farther away from the developing roller than the first boss in the first direction and the third direction.

DETAILED DESCRIPTION

Embodiments of the present disclosure will now be described with reference to the drawings.

A first direction herein refers to the longitudinal direction of each end face of a developer cartridge. A second direction herein refers to the direction along the axis of rotation of a photosensitive drum. A third direction herein refers to the direction in which a plurality of photosensitive drums are arranged. The first direction, the second direction, and the third direction intersect with one another (at right angles in some embodiments).

1. Structure of Image Forming Apparatus

Figure 1:
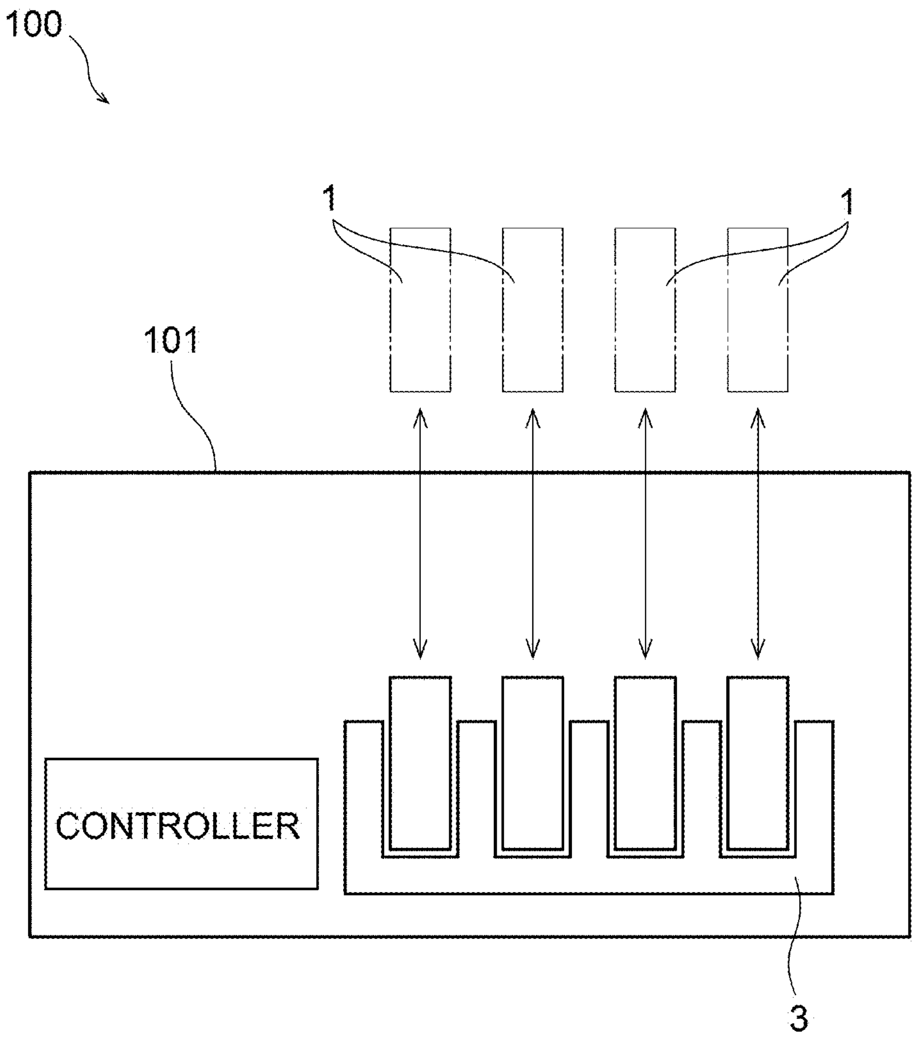
FIG. 1 is a conceptual diagram of an image forming apparatus.

FIG. 1 is a conceptual diagram of an image forming apparatus 100. The image forming apparatus 100 is an electrophotographic printer. The image forming apparatus 100 may be a laser printer or a light-emitting diode (LED) printer. As shown in FIG. 1, the image forming apparatus 100 includes a drum unit 3 and a plurality of developer cartridges 1. The drum unit 3 includes a frame that be configured to hold the developer cartridges 1.

Figure 2:
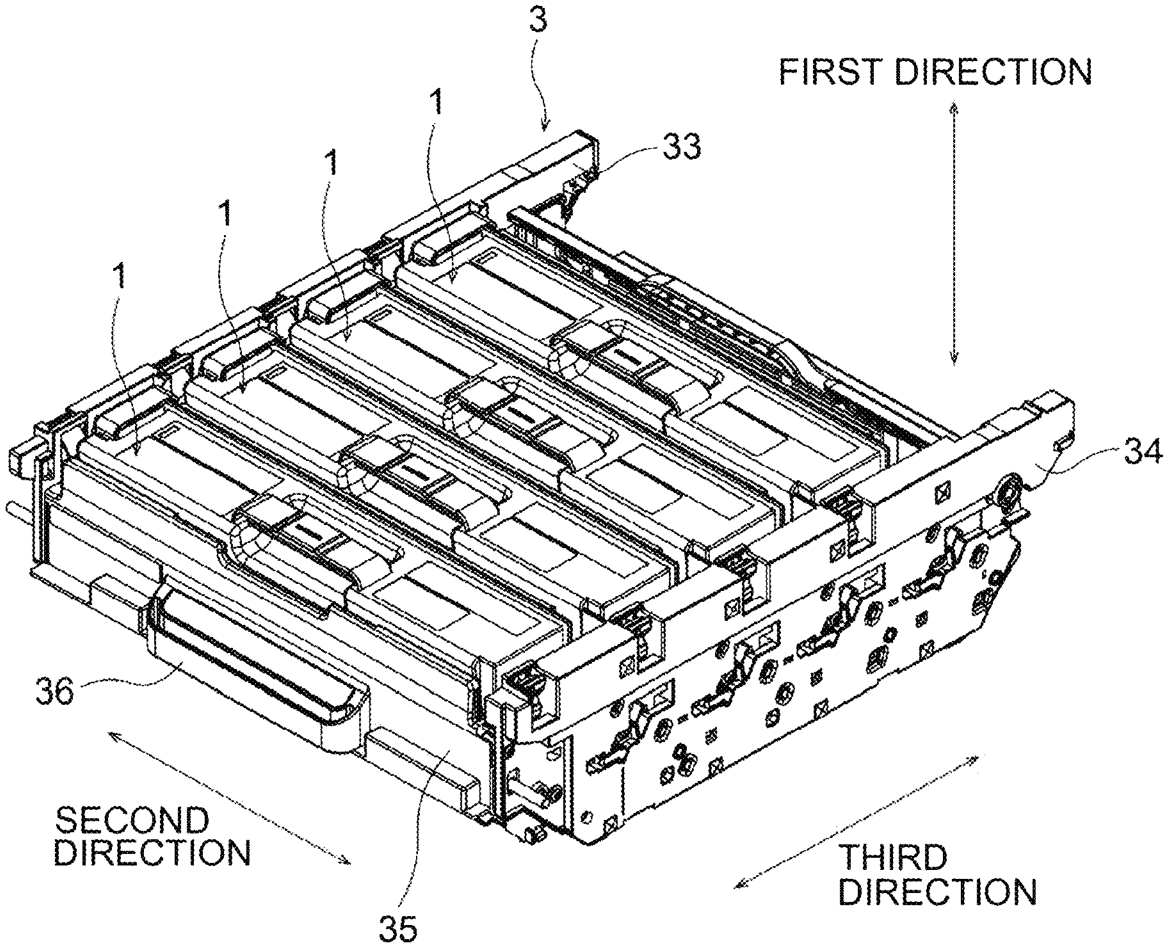
FIG. 2 is a perspective view of a drum unit and developer cartridges.

FIG. 2 is a perspective view of the drum unit 3 and the developer cartridges 1. The developer cartridges 1 are individually attachable to the drum unit 3. The drum unit 3 holding the developer cartridges 1 is configured to be mounted onto the body casing 101 of the image forming apparatus 100 (refer to FIG. 1). The developer cartridges 1 each contain toner (developer) of a different color (e.g., cyan, magenta, yellow, or black). The image forming apparatus 100 forms (outputs) an image on the recording surface of a print sheet with toner fed from the developer cartridges 1. The drum unit 3 in the present embodiment holds four developer cartridges 1. In some embodiments, the drum unit 3 may hold one to three, or five or more developer cartridges 1.

2. Structure of Developer Cartridge

Figure 3:
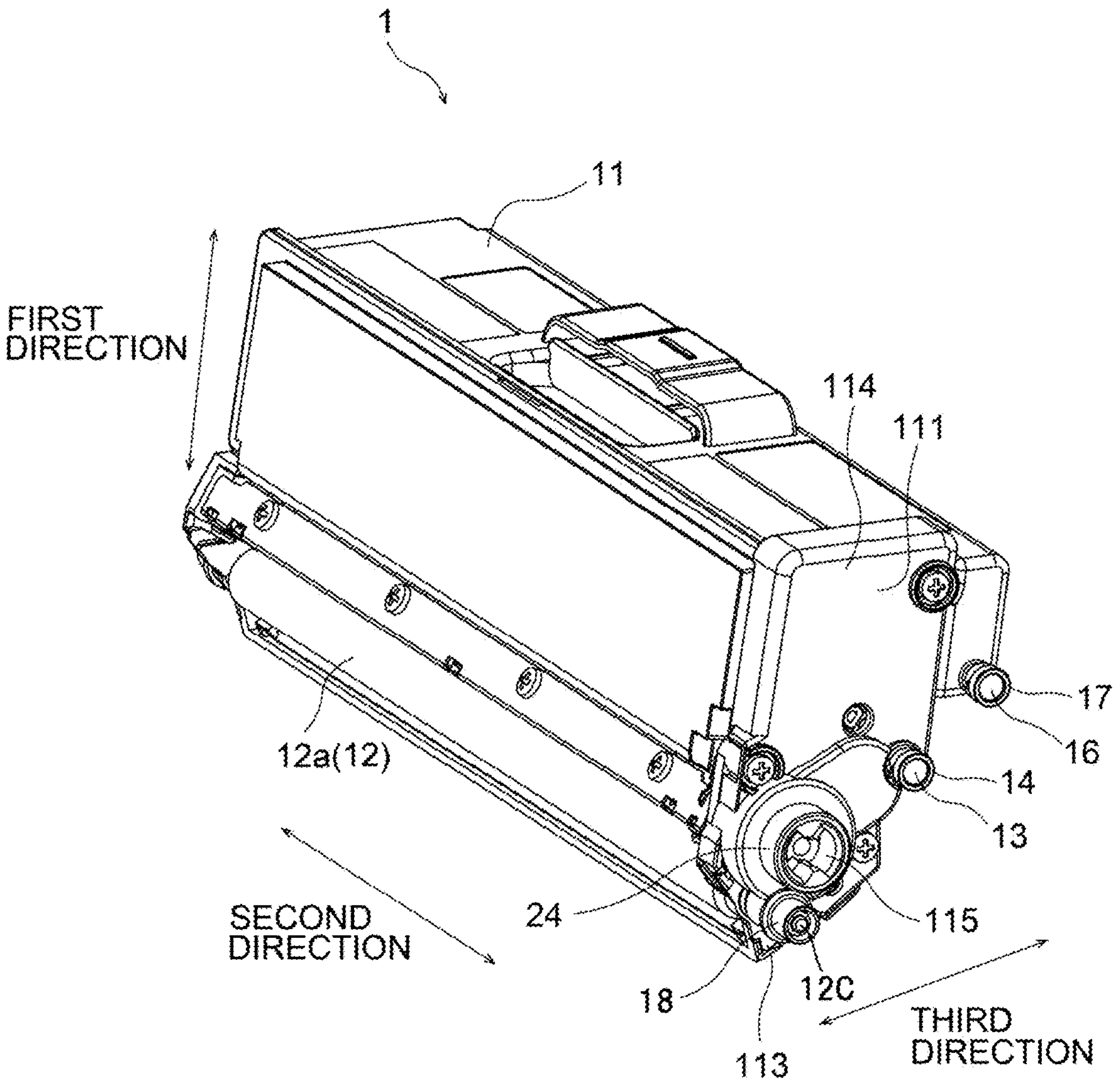
FIG. 3 is a perspective view of a developer cartridge.
Figure 4:
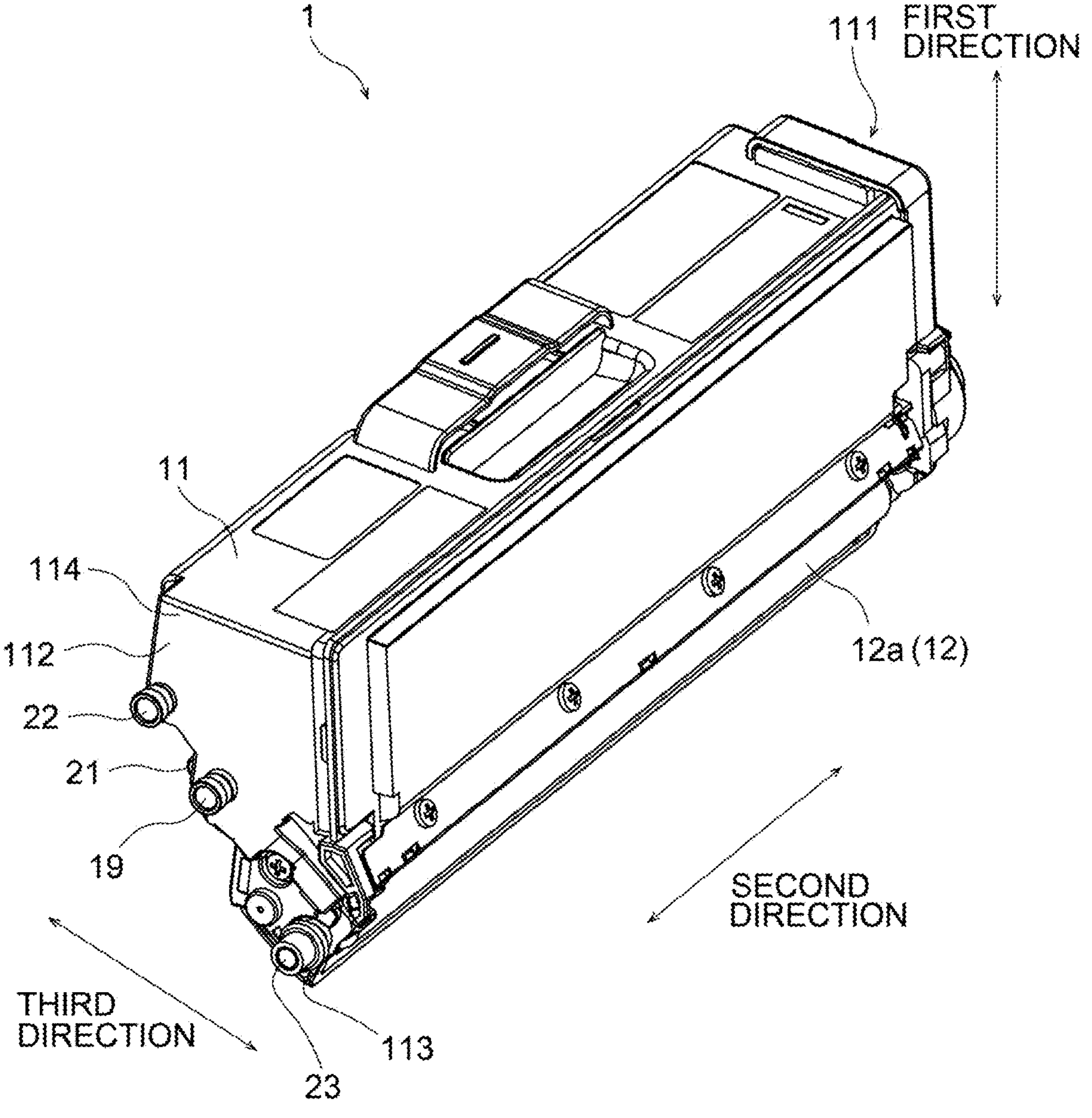
FIG. 4 is a perspective view of the developer cartridge as viewed in a direction different from FIG. 3.
Figure 5:
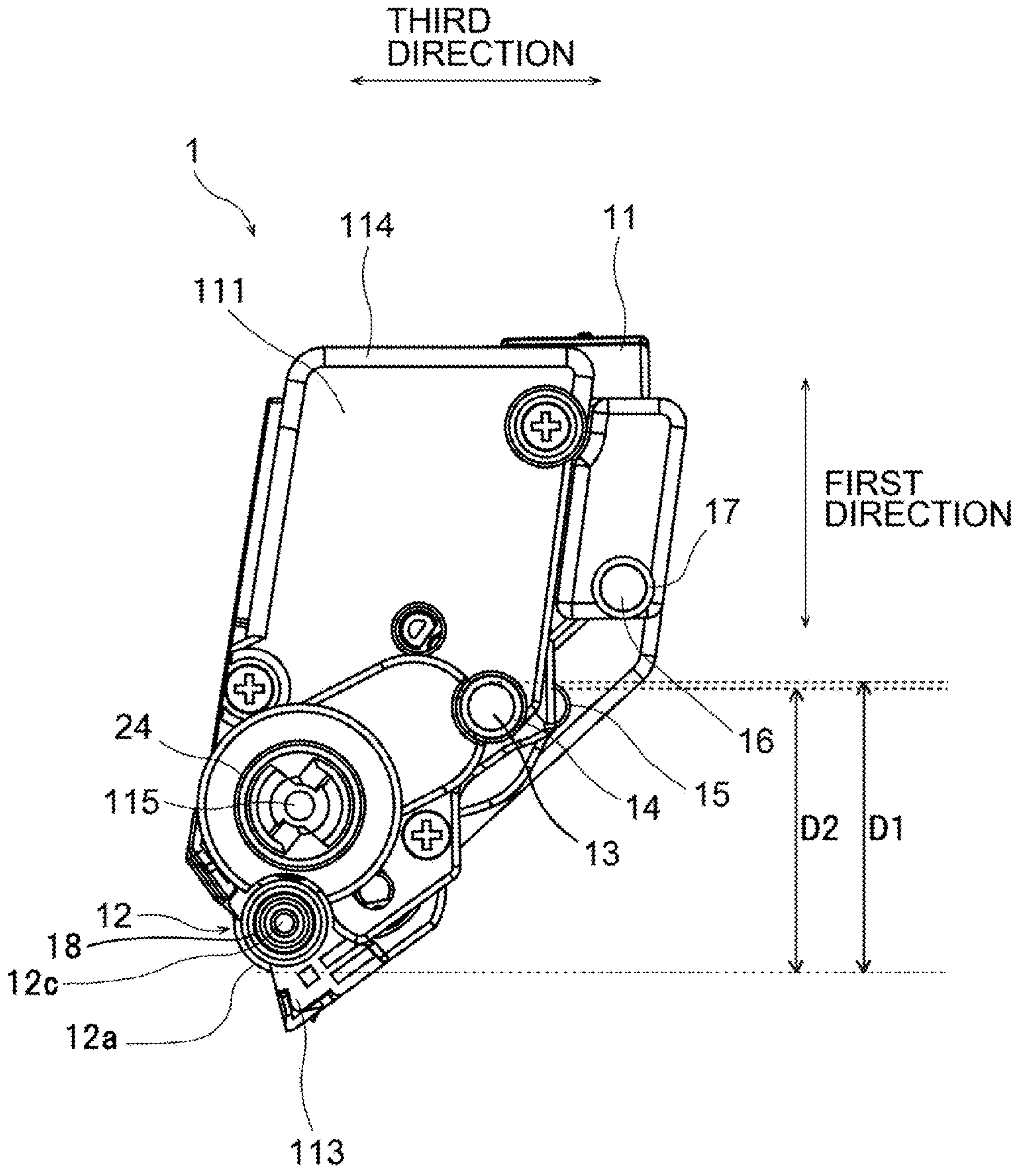
FIG. 5 is a side view of the developer cartridge at one end of the developer cartridge in a second direction.
Figure 6:
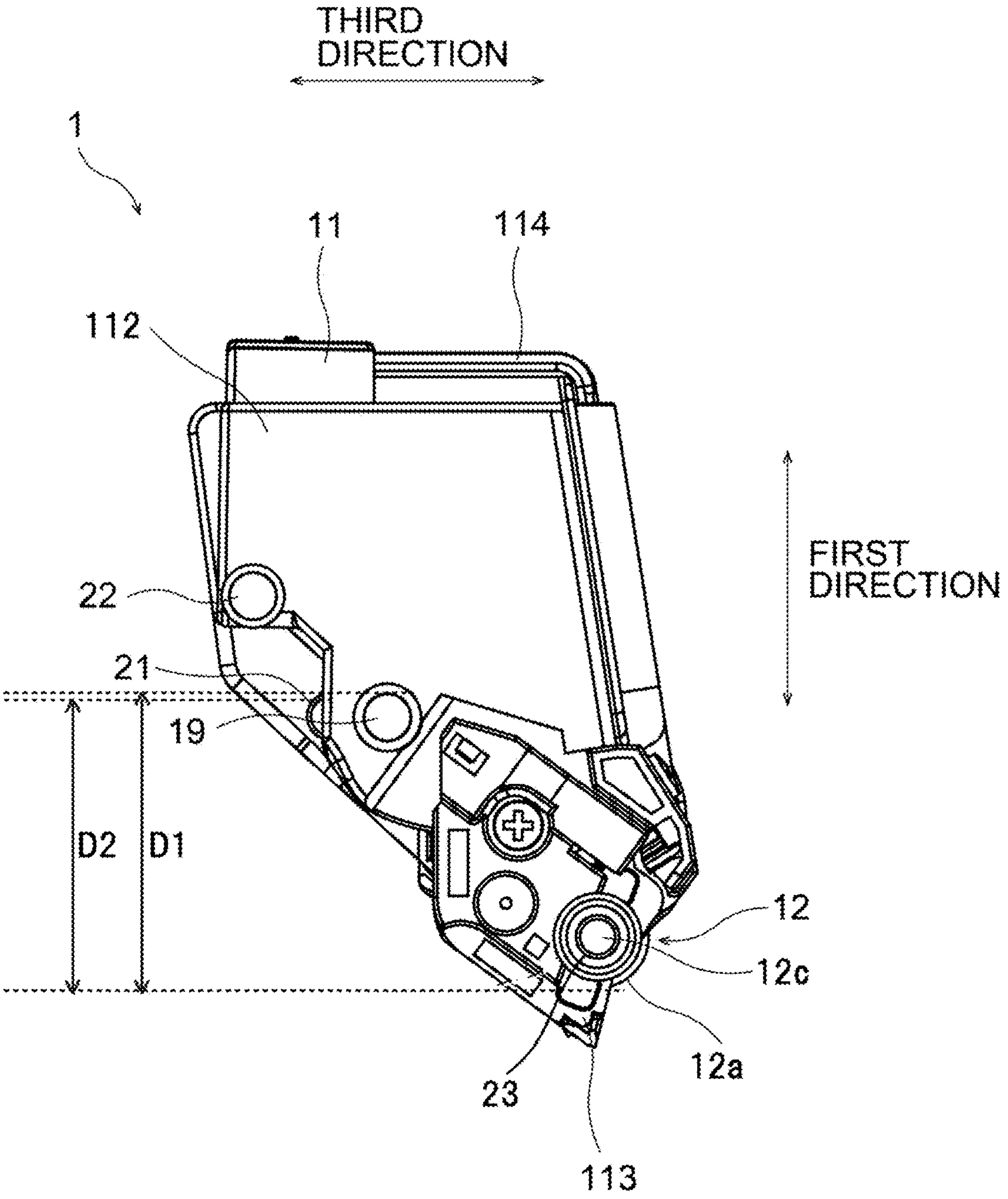
FIG. 6 is a side view of the developer cartridge at other end of the developer cartridge in the second direction.

FIGS. 3 and 4 are perspective views of the developer cartridge 1. FIGS. 5 and 6 show the end faces of the developer cartridge 1 in the second direction. As shown in FIGS. 3 to 6, the developer cartridge 1 according to the present embodiment includes a housing 11, a developing roller 12, an agitator (not shown), and a coupling 24.

The housing 11 is a casing configured to contain toner. The housing 11 has a chamber (not shown) configured to contain toner. The housing 11 extends in the second direction. The housing 11 has a first outer surface 111, and a second outer surface 112 located away from the first outer surface 111 in the second direction. The first outer surface 111 is one end face (first end face) of the housing 11 in the second direction. The longitudinal direction of the first outer surface 111 corresponds to the first direction. The second outer surface 112 is the other end face (second end face) of the housing 11 in the second direction. The longitudinal direction of the second outer surface 112 corresponds to the first direction. The housing 11 has a first end 113 in the first direction, and a second end 114 located away from the first end 113 in the first direction.

The developing roller 12 is rotatable about a roller axis extending in the second direction. The developing roller 12 is located between the first outer surface 111 and the second outer surface 112 of the housing 11 in the second direction. The developing roller 12 is located nearer the first end 113 than the second end 114 in the first direction. The developing roller 12 is located at one end (first end) of the housing 11 in the third direction. In other words, the developing roller 12 is located at one outer surface (third outer surface) of the housing 11 in the third direction.

More specifically, the developing roller 12 includes a cylindrical developing roller body and a cylindrical developing roller shaft **12*c*. The developing roller shaft 12*c* extends through the center of the developing roller body. The developing roller body rotates together with the developing roller shaft 12*c*. The developing roller shaft 12*c* has two ends in the second direction rotatably supported by the two end faces of the housing 11. More specifically, the developing roller shaft 12*c* has a first end in the second direction rotatably supported by the first outer surface 111 of the housing 11 and a second end in the second direction rotatably supported by the second outer surface 112 of the housing 11**.

The developing roller 12 (developing roller body) has an uncovered surface **12*a* and a covered surface 12*b*. The developing roller 12 has the uncovered surface 12*a* located at one end (first end) of the developing roller 12 in the third direction, which is exposed outside the housing 11, and has the covered surface 12*b* located at other end (second end) of the developing roller 12 in the third direction, which is located inside the housing 11. When the developer cartridge 1 is attached to the drum unit 3, the peripheral surface of the developing roller 12 contacts the peripheral surface of the photosensitive drum 31**.

The agitator (not shown) is rotatable about an agitator axis extending in the second direction. The agitator includes a plurality of agitation blades. The agitator is located between the first outer surface 111 of the housing 11 and the second outer surface 112 of the housing 11 in the second direction. In the first direction, the agitator is located nearer the second end 114 than the developing roller 12. The agitator rotates to agitate the toner contained in the chamber of the housing 11.

The coupling 24 shown in FIGS. 3 and 5 receives a drive force applied from the body casing 101 of the image forming apparatus 100. The coupling 24 is rotatable about a coupling axis extending in the second direction. The coupling 24 is located nearer the second end 114 than the developing roller 12 in the first direction. The coupling 24 has a recess 115 in the second direction. When the developer cartridge 1 attached to the drum unit 3 is mounted onto the body casing 101 of the image forming apparatus 100, the drive shaft of the body casing 101 of the image forming apparatus 100 is received in the recess 115. This connects the coupling 24 to the drive shaft in a manner nonrotatable relative to each other. The rotation of the drive shaft rotates the coupling 24. The rotation of the coupling 24 then rotates the developing roller 12 and the agitator.

3. Structure of Drum Unit

Figure 7:
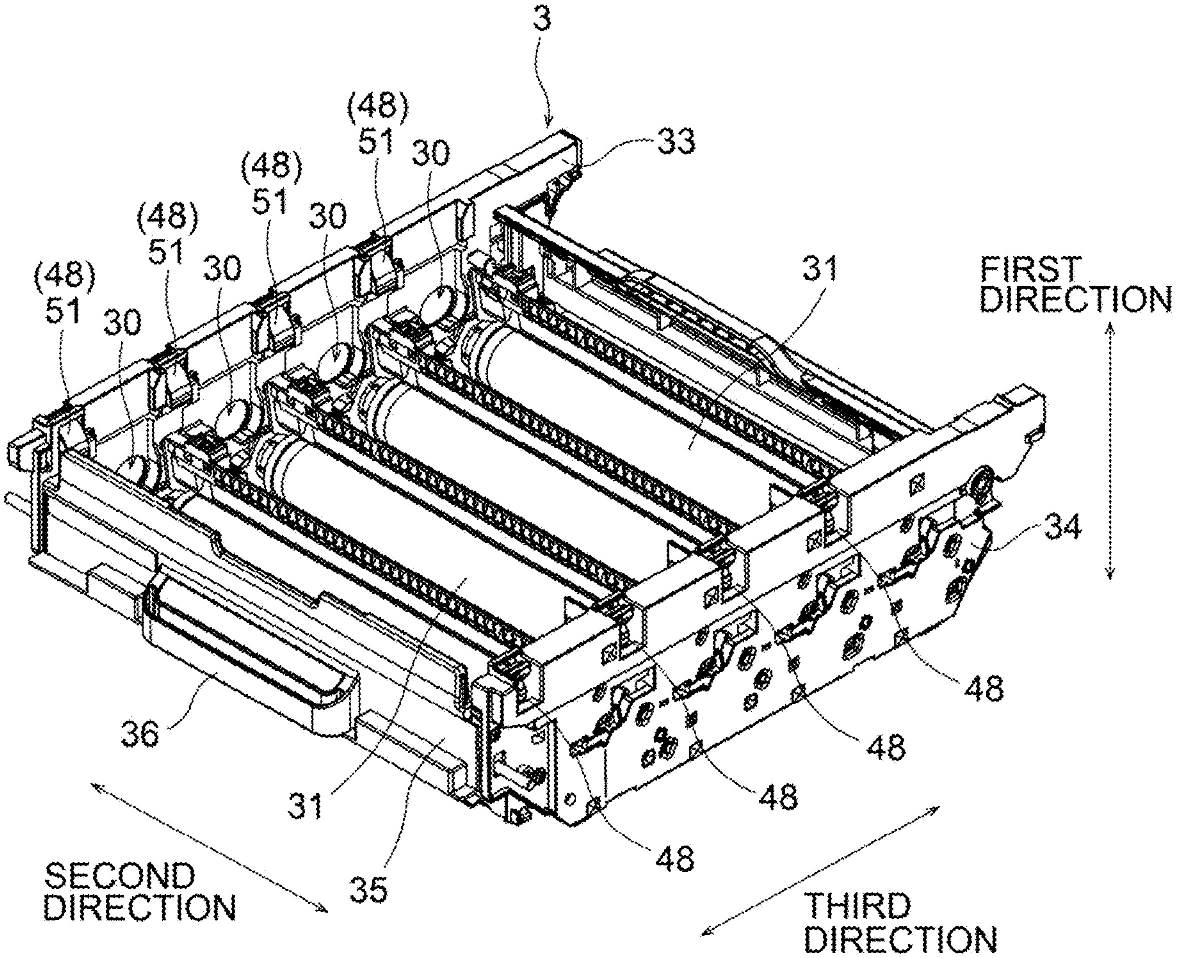
FIG. 7 is a perspective view of the drum unit.

The structure of the drum unit 3 will now be described with reference mainly to FIG. 7. FIG. 7 is a perspective view of the drum unit 3.

Figure 8:
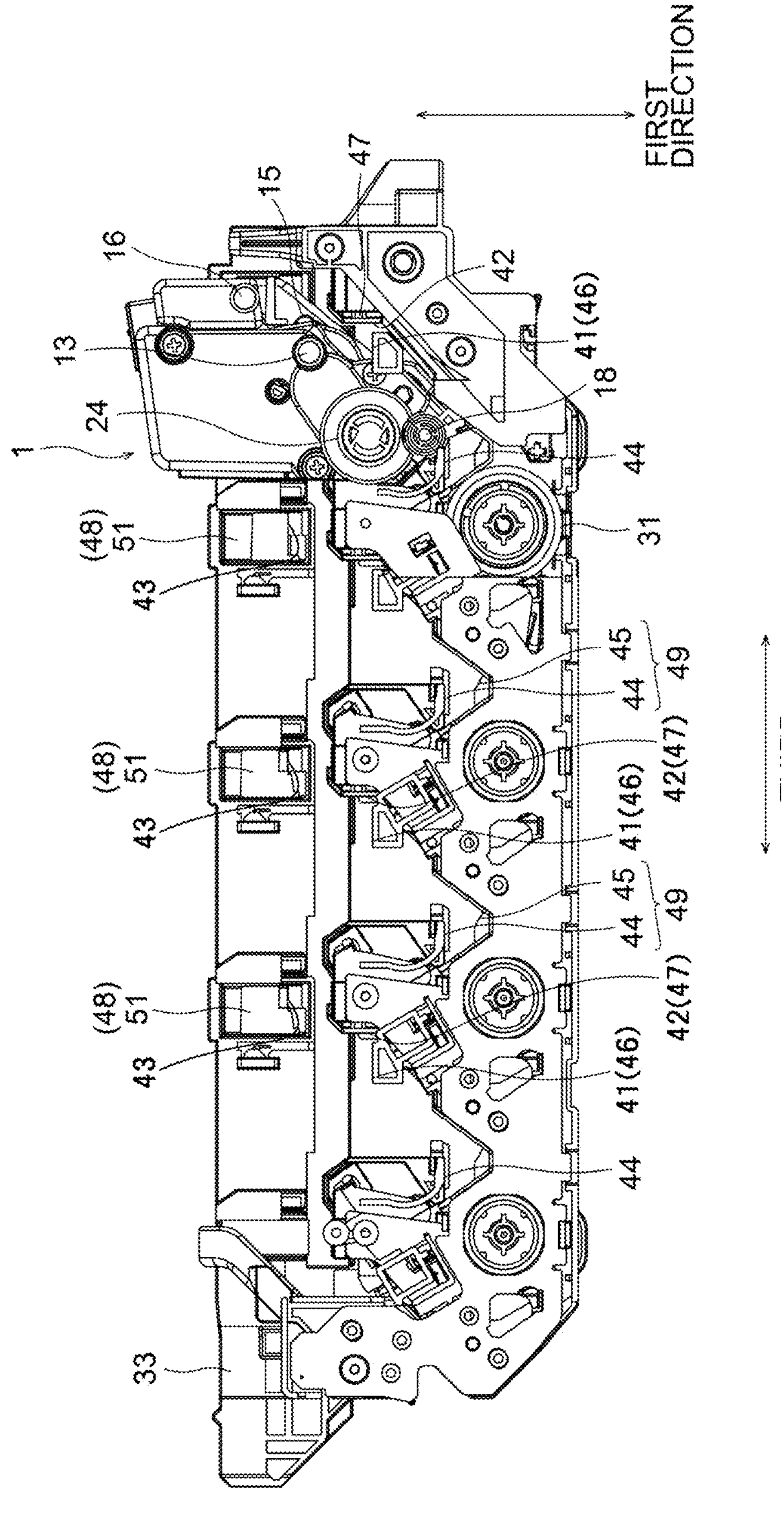
FIG. 8 is a side view of the drum unit showing inner structure of the drum unit in the process of attaching one developer cartridge to the drum unit.
Figure 9:
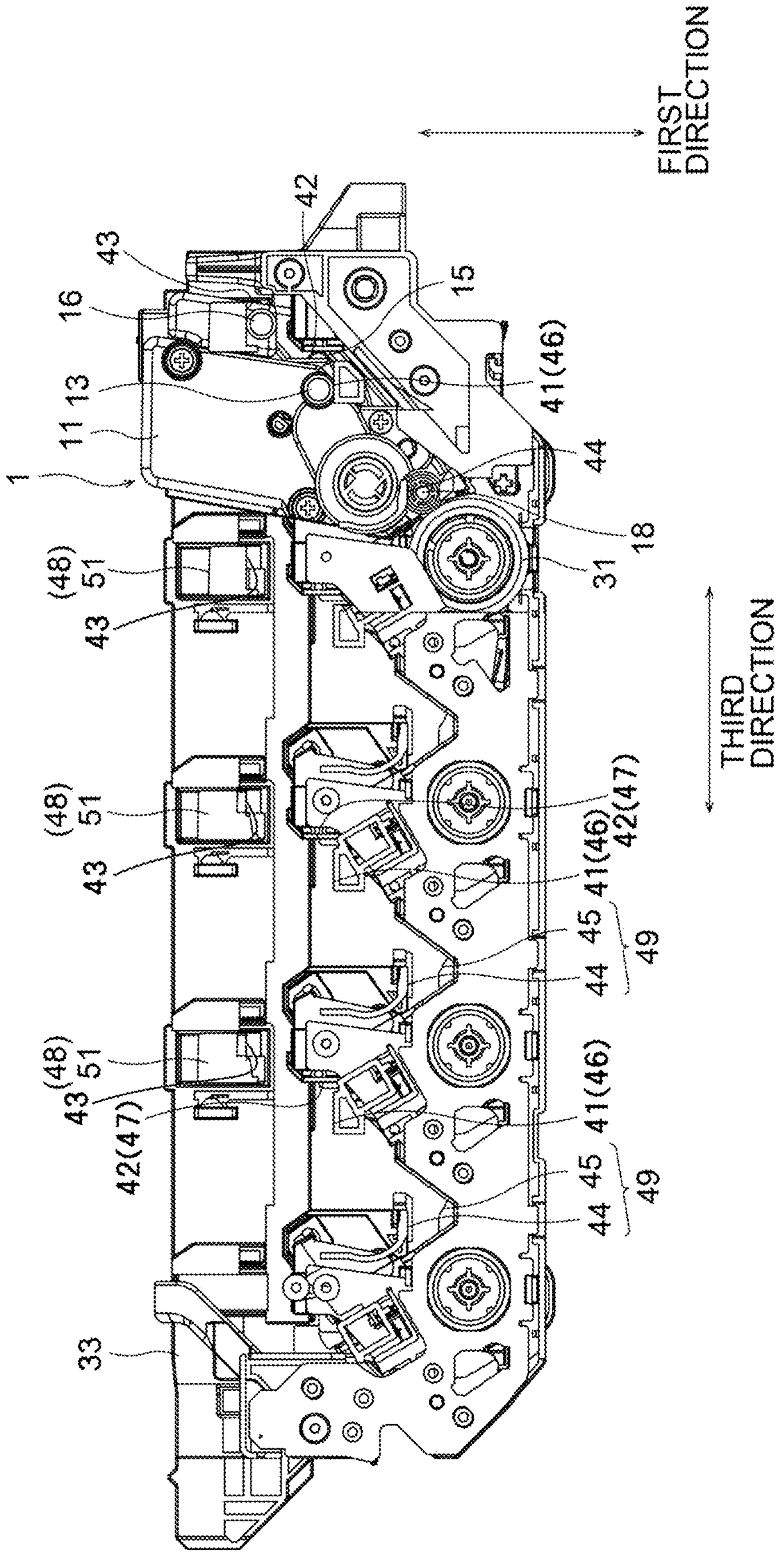
FIG. 9 is a side view of the drum unit showing inner structure of the drum unit, in which the developer cartridge is attached to the drum unit.

As shown in FIGS. 7 to 9, the drum unit 3 includes a plurality of photosensitive drums 31, a first side plate 33, a second side plate 34, and a pullout plate 35. In the present embodiment, the drum unit 3 includes four photosensitive drums 31.

The photosensitive drums 31 transfer toner fed from the developer cartridges 1 to a print sheet. The photosensitive drums 31 are arranged at intervals in the third direction. Each photosensitive drum 31 is cylindrical. Each photosensitive drum 31 has a peripheral surface. Each photosensitive drum 31 extends in the second direction. The peripheral surface of the photosensitive drum 31 is coated with a photosensitive material. Each photosensitive drum 31 is rotatable about a drum axis extending in the second direction.

The first side plate 33, the second side plate 34, and the pullout plate 35 together define a frame. The frame is configured to hold the photosensitive drums 31. The frame has an opening located at one end of the frame in the first direction (in the direction opposite the force of gravity in the present embodiment).

The first side plate 33 supports first ends of the photosensitive drums 31 in the second direction. The first side plate 33 extends perpendicular to the second direction. The first side plate 33 extends in the third direction. The first side plate 33 is a plate. The first side plate 33 includes a plurality of (four in the present embodiment) developer cartridge holders 30. The developer cartridge holders 30 are located at the inner surface of the first side plate 33 in the second direction. The developer cartridge holders 30 are arranged at intervals in the third direction. The developer cartridge holders 30 of the first side plate 33 receive first ends of the developer cartridges 1 in the second direction (ends at the first outer surfaces 111).

The second side plate 34 supports second ends of the photosensitive drums 31 in the second direction. The second side plate 34 extends perpendicular to the second direction. The second side plate 34 extends in the third direction. The second side plate 34 is a plate. The second side plate 34 includes a plurality of (four in the present embodiment) developer cartridge holders (not shown). The developer cartridge holders are located at the inner surface of the second side plate 34 in the second direction. Number of the developer cartridge holders of the second side plate 34 is equal to number of the developer cartridge holders 30 of the first side plate 33. The developer cartridge holders of the second side plate 34 receive second ends of the developer cartridges 1 in the second direction (ends at the second outer surfaces 112).

The pullout plate 35 connects a second end of the first side plate 33 in the third direction and a second end of the second side plate 34 in the third direction. The pullout plate 35 extends perpendicular to the third direction. The pullout plate 35 extends in the second direction. The pullout plate 35 is a plate. The pullout plate 35 has a handle 36. The handle 36 is located at an outer side surface of the pullout plate 35 in the third direction. The handle 36 is gripped by a user to pull or push the drum unit 3 out of or into the body casing 101.

When the developer cartridge 1 is attached to the drum unit 3, the first end of the housing 11 in the second direction held by the developer cartridge holder 30 of the first side plate 33 and the second end of the housing 11 in the second direction held by the developer cartridge holder in the second side plate 34. When the developer cartridge 1 is attached to the drum unit 3, the peripheral surface (uncovered surface 12*a*) of the developing roller 12 contacts the peripheral surface of the photosensitive drum 31.

The image forming apparatus 100 with the above structure forms an image on a print sheet. As the coupling 24 and also the photosensitive drum 31 rotate, the toner is fed from the chamber of the housing 11 to the peripheral surface of the photosensitive drum 31 through the developing roller 12. The toner retained on the peripheral surface of the developing roller 12 moves from the developing roller 12 to the photosensitive drum 31 in accordance with an electrostatic latent image formed on the peripheral surface of the photosensitive drum 31. The electrostatic latent image thus appears on the peripheral surface of the photosensitive drum 31. The photosensitive drum 31 then transfers the toner onto the print sheet.

4. Detailed Structure for Attachment and Removal

Figure 10:
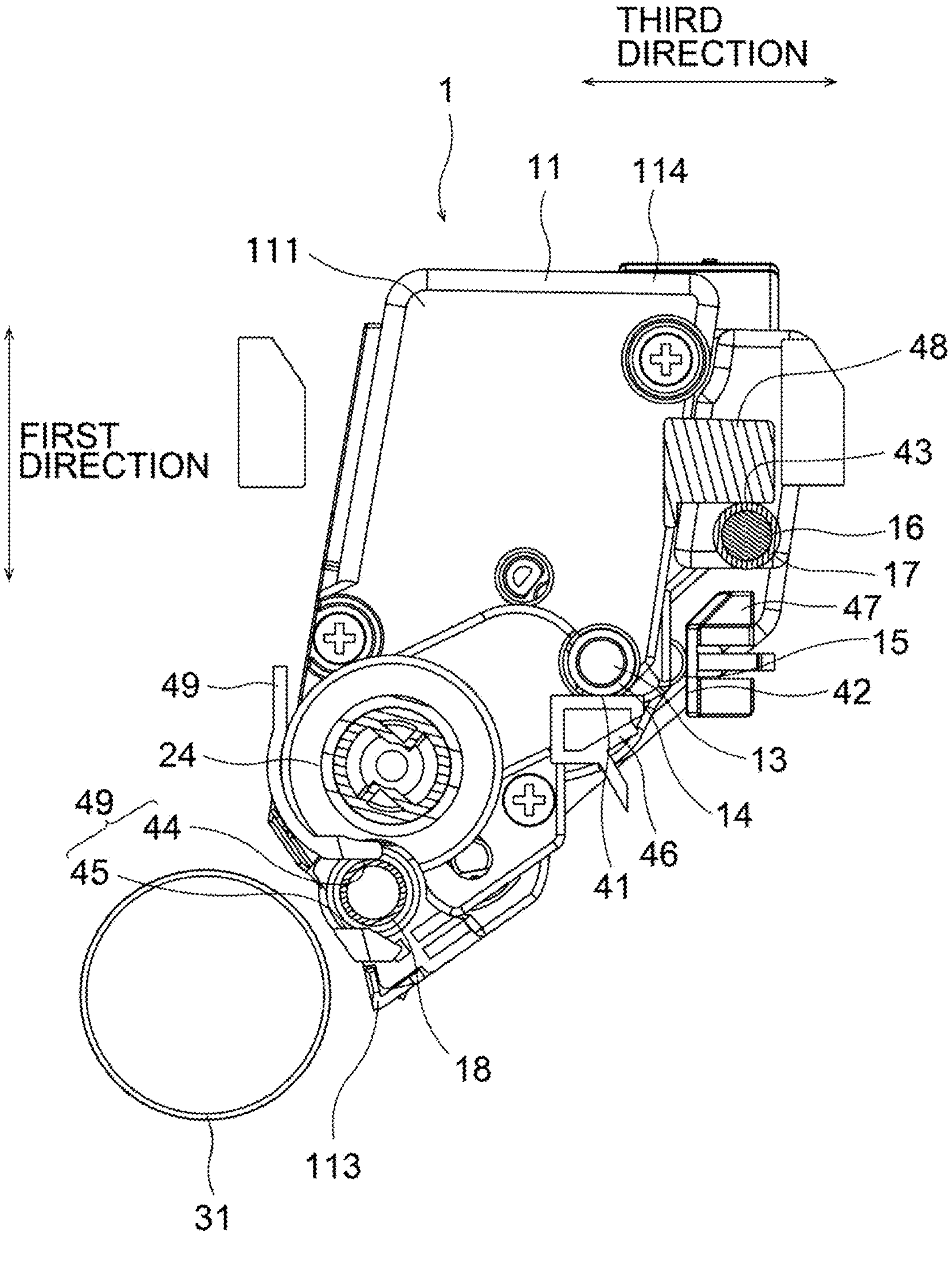
FIG. 10 is a side view of the developer cartridge in the process of being attached to the drum unit.
Figure 11:
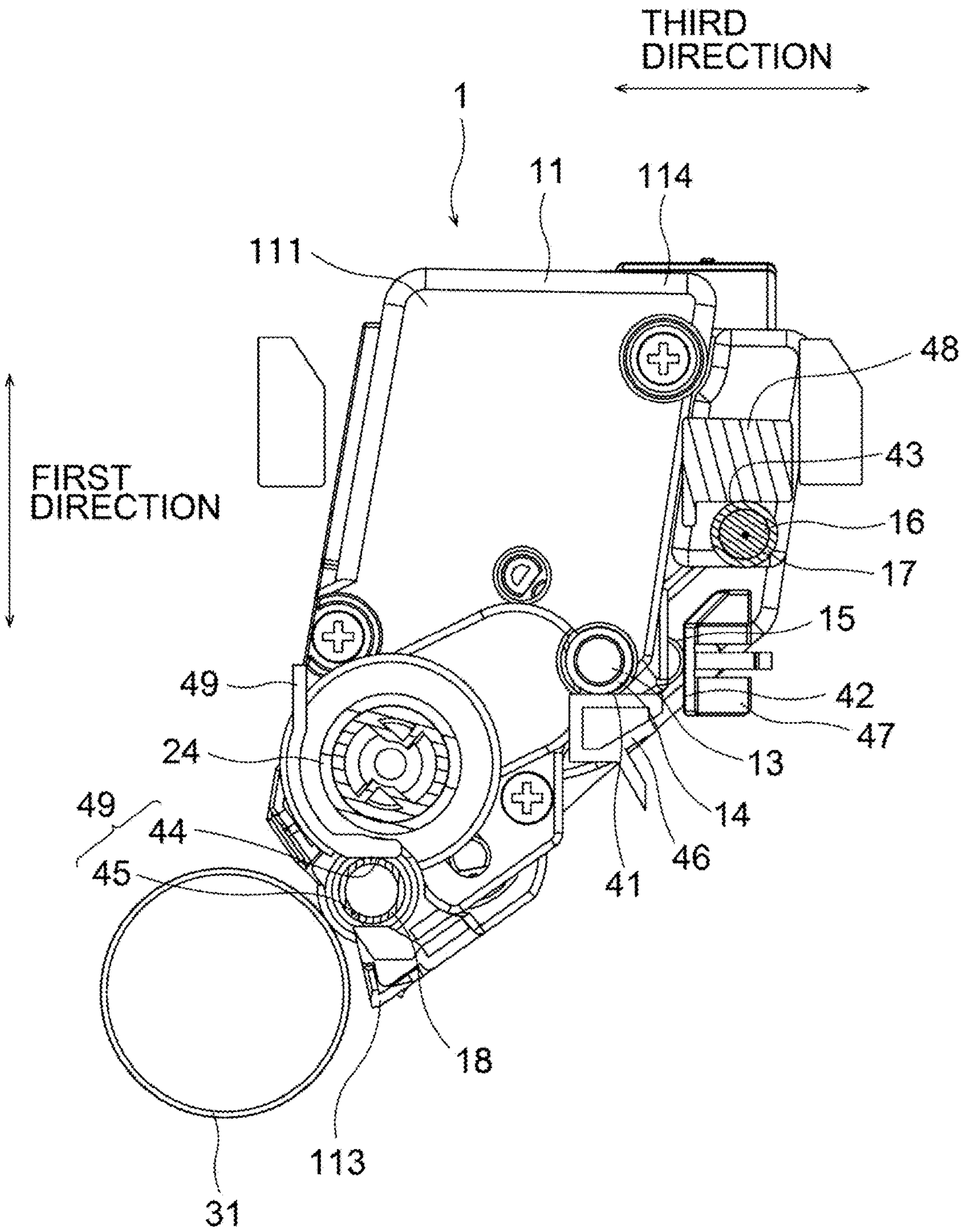
FIG. 11 is a side view of the developer cartridge that be attached to the drum unit.
Figure 12:
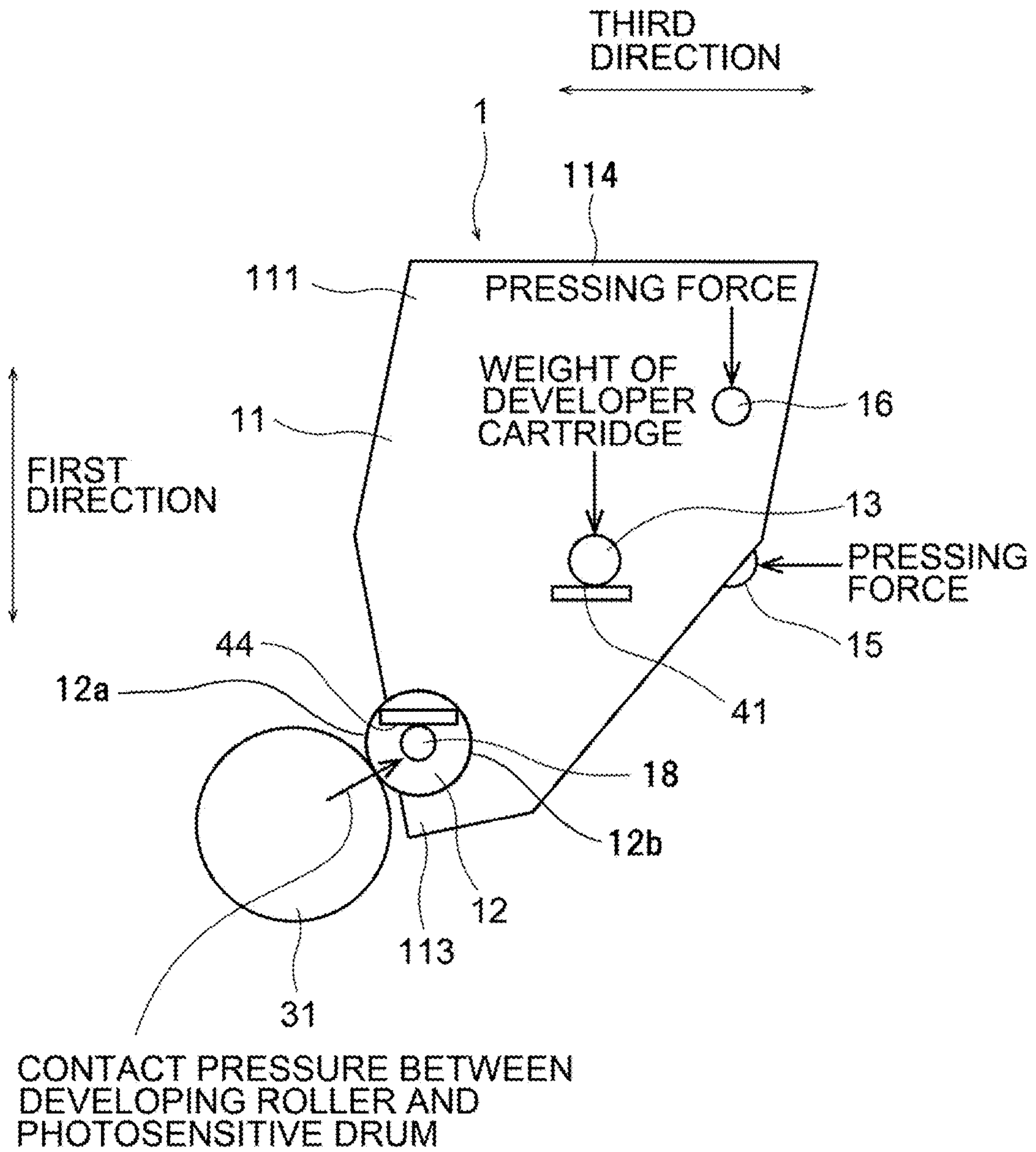
FIG. 12 is a schematic diagram describing forces acting relative to one another in the process of attaching the developer cartridge to the drum unit.

The structure according to the present embodiment for attaching and removing the developer cartridges 1 to and from the drum unit 3 will now be described with reference to FIGS. 3 to 12. FIG. 8 is a side view of the drum unit 3 showing inner structure of the drum unit 3 in the process of attaching one developer cartridge 1. FIG. 9 is a side view of the drum unit 3 showing inner structure of the drum unit 3, in which the developer cartridge 1 is attached to the drum unit 3. FIG. 10 is a side view of the developer cartridge 1 in the process of being attached to the developer cartridge holder 30 of the drum unit 3. FIG. 11 is a side view of the developer cartridge 1 that is attached to the developer cartridge holder 30 of the drum unit 3. FIG. 12 is a schematic diagram describing forces acting relative to one another in the process of attaching the developer cartridge 1 to the developer cartridge holder 30 of the drum unit 3.

The developer cartridge 1 according to the present embodiment includes a first boss 13, a first collar 14, a first pressure receiving surface (pressure receiving surface) 15, a second boss 16, a second collar 17, a first protrusion 18, a third boss 19, a second pressure receiving surface 21, a fourth boss 22, and a second protrusion 23.

The first boss 13 extends in the second direction. The first boss 13 in the present embodiment is a separate component from the housing 11, and is fixed to the housing 11. In some embodiments, the first boss 13 may be integral with the housing 11. The first boss 13 is movable together with the housing 11. The first boss 13 is located at the first outer surface 111. More specifically, the first boss 13 protrudes from the first outer surface 111 outward in the second direction. As described in detail later, the first boss 13 bears the weight of the developer cartridge 1. The first boss 13 is located away from the developing roller 12 in both the first and third directions. As described in detail later, the first boss 13 is supported by a support surface 41 (described later) of the drum unit 3 when the developer cartridge 1 is attached to the drum unit 3.

The first collar 14 is cylindrical. The first collar 14 is rotatable about the first boss 13. The first collar 14 has hollow. The first collar 14 receives the first boss 13. In some embodiments, the first collar 14 may not be cylindrical. For example, the first collar 14 may be polygonal. The developer cartridge 1 may not include the first collar 14. In this case, a peripheral surface of the first boss 13 may serve as the first collar.

The first pressure receiving surface 15 has arc-shaped surface curved along an arc about a straight line in the second direction. The first pressure receiving surface 15 is located inward from the first outer surface 111 in the second direction. In the third direction, the first pressure receiving surface 15 is located farther away from the developing roller 12 than the first boss 13. The first pressure receiving surface 15 is located at a second end of the housing 11 (opposite to the developing roller 12) in the third direction. In other words, the first pressure receiving surface 15 is located at an outer surface of the second end of the housing 11 in the third direction.

The first boss 13 is located away from the developing roller 12 by a first distance D1 in the first direction. The first pressure receiving surface 15 is located away from the developing roller 12 by the first distance D1 or a second distance D2 smaller than the first distance D1 (D2≤D1) in the first direction. In the present embodiment, as shown in FIGS. 5 and 6, the distance between the first pressure receiving surface 15 and the developing roller 12 in the first direction is substantially equal to the first distance D1.

In the present embodiment, the first distance D1 can be defined as the distance between the peripheral surface of the first boss 13 and the peripheral surface of the developing roller 12, and the second distance D2 can be defined as the distance between the outer surface of the first pressure receiving surface 15 and the peripheral surface of the developing roller 12. In some embodiments, these distances may be defined differently. For example, the first distance D1 may be the distance between the center of rotation of the first boss 13 and the center of rotation of the developing roller 12, and the second distance D2 may be the distance between the center of the arc defined by the outer surface of the first pressure receiving surface 15 and the center of rotation of the developing roller 12. In other embodiments, the first distance D1 may be the distance between the peripheral surface of the first boss 13 and the peripheral surface of the developing roller shaft 12*c*, and the second distance D2 may be the distance between the outer surface of the first pressure receiving surface 15 and the peripheral surface of the developing roller shaft 12*c*.

The second boss 16 extends in the second direction. The second boss 16 in the present embodiment is a separate component from the housing 11, and is fixed to the housing 11. In some embodiments, the second boss 16 may be integral with the housing 11. The second boss 16 is movable together with the housing 11. More specifically, the second boss 16 protrudes outward in the second direction. The second boss 16 is located farther away from the developing roller 12 in both the first and third directions than the first boss 13. In other words, the second boss 16 is opposed to the developing roller 12 toward the first boss 13 in the first direction. The second boss 16 is opposed to the first boss 13 toward the developing roller 12 in the third direction. As described in detail later, the second boss 16 receives a pressing force directed from the second end 114 toward the first end 113 in the first direction when the developer cartridge 1 is attached to the drum unit 3.

The second collar 17 is cylindrical. The second collar is rotatable about the second boss 16. The second collar 17 has hollow. The second collar 17 receives the second boss 16. In some embodiments, the second collar 17 may not be cylindrical. For example, the second collar 17 may be polygonal. The developer cartridge 1 may not include the second collar 17. In this case, a peripheral surface of the second boss 16 may serve as the second collar.

The first protrusion 18 extends in the second direction. The first protrusion 18 is located at a first end of the developing roller 12 in the second direction. More specifically, the first protrusion 18 is located at a first end of the developing roller shaft 12*c* in the second direction. The first protrusion 18 is a separate component from the developing roller 12, and is attached to the developing roller 12. More specifically, the first protrusion 18 is a separate component from the developing roller shaft 12*c*, and is attached to the developing roller shaft 12*c*. In some embodiments, the first protrusion 18 may be integral with the developing roller 12. More specifically, the first protrusion 18 may be integral with the developing roller shaft 12*c*. As described in detail later, the first protrusion 18 contacts a guide 49 of the drum unit 3 when the developer cartridge 1 is attached to the drum unit 3. The first protrusion 18 thus positions the developer cartridge 1 relative to the drum unit 3.

The third boss 19 shown in FIGS. 4 and 6 extends in the second direction. The third boss 19 in the present embodiment is a separate component from the housing 11, and is fixed to the housing 11. In some embodiments, the third boss 19 may be integral with the housing 11. The third boss 19 is movable together with the housing 11. The third boss 19 is located at the second outer surface 112. More specifically, the third boss 19 protrudes from the second outer surface 112 outward in the second direction. The third boss 19 is located at an axis of the first boss 13 extending in the second direction. As described in detail later, the third boss 19 and the first boss 13 together bear the weight of the developer cartridge 1. The developer cartridge 1 includes a third collar that is rotatable about the third boss 19, which is similar to the first collar 14.

The second pressure receiving surface 21 has arc-shaped surface curved along an arc about a straight line in the second direction. The second pressure receiving surface 21 is located away from the first pressure receiving surface 15 in the second direction. The second pressure receiving surface 21 is located inward from the second outer surface 112 in the second direction. The second pressure receiving surface 21 overlaps the first pressure receiving surface 15 when viewed in the second direction. In other words, the second pressure receiving surface 21 is located farther away from the developing roller 12 than the third boss 19 in the third direction.

The third boss 19 is located away from the developing roller 12 by a first distance D1 in the first direction. The second pressure receiving surface 21 is located away from the developing roller 12 by the first distance D1 or a second distance D2 smaller than the first distance D1 in the first direction (D2≤D1).

The fourth boss 22 extends in the second direction. The fourth boss 22 in the present embodiment is a separate component from the housing 11, and is fixed to the housing 11. In some embodiments, the fourth boss 22 may be integral with the housing 11. The fourth boss 22 is movable together with the housing 11. The fourth boss 22 is located at the second outer surface 112. More specifically, the fourth boss 22 protrudes from the second outer surface 112 outward in the second direction. The fourth boss 22 is located at an axis of the second boss 16 extending in the second direction. The developer cartridge 1 has a fourth collar that is rotatable about the fourth boss 22, which is similar to the second collar 17.

The second protrusion 23 extends in the second direction. The second protrusion 23 is located at a second end of the developing roller 12 in the second direction. More specifically, the second protrusion 23 is located at a second end of the developing roller shaft 12*c* in the second direction. The second protrusion 23 is a separate component from the developing roller 12, and is attached to the developing roller 12. More specifically, the second protrusion 23 is a separate component from the developing roller shaft 12*c*, and is attached to the developing roller shaft 12*c*. In some embodiments, the second protrusion 23 may be integral with the developing roller 12. More specifically, the second protrusion 23 may be integral with the developing roller shaft 12*c*.

The second protrusion 23 is located at an axis of the first protrusion 18 extending in the second direction. As described in detail later, the second protrusion 23 and the first protrusion 18 together position the developer cartridge 1 relative to the drum unit 3.

The image forming apparatus 100 according to the present embodiment includes the developer cartridge holders 30 of the first side plate 33 and the developer cartridge holders of the second side plate 34. More specifically, the developer cartridge holders 30 of the first side plate 33 and the developer cartridge holders of the second side plate 34 in the present embodiment each include a support 46, a pressing member 47, a lock lever 48, and a guide 49 as shown in FIGS. 8 and 9. The support 46, the pressing member 47, the lock lever 48, and the guide 49 of each developer cartridge holder 30 of the first side plate 33 are paired with these components in the corresponding developer cartridge holder of the second side plate 34. The developer cartridge holders 30 of the first side plate 33 will be mainly described, without repeatedly describing the developer cartridge holders of the second side plate 34.

The support 46 has a support surface 41 as shown in FIG. 10. The support 46 protrudes from the inner surface of the first side plate 33 in the second direction. The support surface 41 faces in the direction opposite the force of gravity. The support surface 41 is a flat surface perpendicular to the first direction. The support surface 41 supports the first boss 13 through the first collar 14 when the developer cartridge 1 is attached to the developer cartridge holder 30 of the drum unit 3.

The pressing member 47 has a first pressing surface 42. The pressing member 47 is located at the inner surface of the first side plate 33. The first pressing surface 42 is a flat surface substantially perpendicular to the third direction. The first pressing surface 42 is slidable in the third direction. The pressing member 47 includes a spring (not shown), which is an elastic member. When the first pressing surface 42 moves toward a second end of the drum unit 3 in the third direction, the spring of the pressing member 47 presses back the first pressing surface 42 toward a first end of the drum unit 3 in the third direction. The first pressing surface 42 contacts the first pressure receiving surface 15 of the housing 11 when the developer cartridge 1 is attached to the developer cartridge holder 30 of the drum unit 3. The first pressure receiving surface 15 receives, from the first pressing surface 42, a pressing force directed from the second end of the drum unit 3 in the third direction toward the first end of the drum unit 3 in the third direction.

The lock lever 48 is located at a first end of the first side plate 33 in the first direction (end in the direction opposite the force of gravity). The lock lever 48 has a second pressing surface 43 and a guide surface 51. The guide surface 51 is arc-shaped. The second pressing surface 43 is a flat surface continuous with the guide surface 51. The lock lever 48 is pivotable about a pivot axis extending in the third direction between a lock position and a release position. When the lock lever 48 is at the lock position, the guide surface 51 is at least partially located between the first side plate 33 and the second side plate 34, and the second pressing surface 43 is substantially perpendicular to the first direction and faces toward a second end of the drum unit 3 in the first direction. When the lock lever 48 is at the release position, the guide surface 51 is located farther away from the second side plate 34 in the second direction than when the lock lever 48 is at the lock position. The lock lever 48 includes a spring (not shown), which is an elastic member. The spring in the lock lever 48 presses the second pressing surface 43 to the lock position. The second pressing surface 43 contacts the second boss 16 through the second collar 17 when the developer cartridge 1 is attached to the developer cartridge holder 30 of the drum unit 3. The second boss 16 receives, from the second pressing surface 43, a pressing force directed from the first end toward the second end of the drum unit 3 in the first direction.

The guide 49 has a first guide surface 44 and a second guide surface 45. The guide 49 is located at the inner surface of the first side plate 33. The guide 49 is arc-shaped. The first guide surface 44 is a flat surface substantially perpendicular to the first direction. The first guide surface 44 contacts the first protrusion 18 when the developer cartridge 1 rotates about the first boss 13 in the process of being attached to the developer cartridge holder 30 of the drum unit 3. The first guide surface 44 thus positions the developer cartridge 1 relative to the drum unit 3. At this position, the developing roller 12 is adjacent to the photosensitive drum 31.

The second guide surface 45 has a flat surface and a slope surface continuous with the flat surface. The flat surface is substantially perpendicular to the first direction. One end of the slope surface in the third direction connects to the flat surface. The slope surface slopes from one end of the slope surface in the first direction to the other end of the slope surface in the first direction toward the other end of the slope surface in the third direction. The second guide surface 45 is spaced from the first protrusion 18 in the first direction when the developer cartridge 1 rotates about the first boss 13 in the process of being attached to the developer cartridge holder 30 of the drum unit 3. At this position, the developing roller 12 is adjacent to the photosensitive drum 31.

5. Forces Acting Relative to One Another in Attaching Developer Cartridge

The forces acting relative to one another in the process of attaching the developer cartridge 1 to the drum unit 3 will now be described with reference to FIGS. 8 to 12.

To attach the developer cartridge 1 to the drum unit 3, the user first holds the developer cartridge 1 to have the first end 113 of the housing 11 in the first direction facing the second end of the drum unit 3 in the first direction and the second end 114 of the housing 11 of the first direction facing the first end of the drum unit 3 in the first direction. The user then inserts the developer cartridge 1 into the developer cartridge holders (the developer cartridge holder 30 of the first side plate 33 and the developer cartridge holder of the second side plate 34) from the first end of the drum unit 3 in the first direction toward the second end of the drum unit 3 in the first direction (refer to FIG. 8). As a result, the peripheral surface of the first boss 13 is supported by the support surface 41 of the drum unit 3 in the first direction through the first collar 14. The support surface 41 bears the weight of the developer cartridge 1.

As the user inserts the developer cartridge 1 further into the drum unit 3 from the first end of the drum unit 3 in the first direction toward the second end of the drum unit 3 in the first direction, the arc-shaped guide surface 51 is pushed by the second boss 16 (second collar 17) to smoothly pivot outward in the drum unit 3 in the second direction against the pressing force of the spring of the lock lever 48. This moves the lock lever 48 to the release position, and allows the developer cartridge 1 to move toward the second end of the drum unit 3 in the first direction. This positions the second boss 16 nearer the second end of the drum unit 3 in the first direction than the lock lever 48. Subsequently, the second pressing surface 43 under the pressing force of the spring of the lock lever 48 pivots inward in the drum unit 3, and places the lock lever 48 to the lock position.

As shown in FIG. 10, the second boss 16 (second collar 17) contacts the second pressing surface 43 at the lock position to receive, from the second pressing surface 43, a pressing force directed from the second end 114 of the housing 11 toward the first end 113 of the housing 11 in the first direction. At this position, the peripheral surface of the first boss 13 is supported by the support surface 41 in the first direction. These opposite forces cause a rotation moment in the developer cartridge 1 about the first boss 13. This slightly rotates the developer cartridge 1 about the first boss 13 in the drum unit 3, and moves the developing roller 12 toward the photosensitive drum 31. As the developing roller 12 moves toward the photosensitive drum 31, the first protrusion 18 contacts the first guide surface 44 to stop the rotation of the developer cartridge 1 about the first boss 13. This determines the angle of contact between the developing roller 12 and the photosensitive drum 31, and appropriately positions the developing roller 12 relative to the photosensitive drum 31. In other words, the developer cartridge 1 is positioned in the drum unit 3.

As the user inserts the developer cartridge 1 into the drum unit 3 from the first end of the drum unit 3 in the first direction toward the second end of the drum unit 3 in the first direction, the first pressing surface 42 is pushed by the first pressure receiving surface 15 to move toward the second end of the drum unit 3 in the third direction against the pressing force of the spring in the pressing member 47. The first pressure receiving surface 15 thus receives, from the first pressing surface 42, a pressing force directed from the covered surface **12*b* toward the uncovered surface 12*a* in the third direction at the same time as or subsequently to slight rotation of the developer cartridge 1 about the first boss 13. At this position, the support surface 41 receives the weight of the developer cartridge 1 applied through the first boss 13. The first boss 13 (first collar 14) thus slides toward the first end of the drum unit 3 in the third direction while being supported by the support surface 41. This moves the developing roller 12 further toward the photosensitive drum 31, and allows the peripheral surface of the developing roller 12 (developing roller body) to contact the peripheral surface of the photosensitive drum 31 under an appropriate contact pressure. At this position, the support surface 41 bears the weight of the developer cartridge 1. The weight of the developer cartridge 1 is less likely to affect the contact pressure between the developing roller 12 and the photosensitive drum 31. This prevents the contact pressure between the developing roller 12 and the photosensitive drum 31 from varying greatly depending on the amount of toner remaining in the developer cartridge 1**.

Immediately before the peripheral surface of the developing roller 12 (developing roller body) contacts the peripheral surface of the photosensitive drum 31, the first protrusion 18 is held between the first guide surface 44 and the second guide surface 45 in the first direction (refer to FIG. 10). This structure appropriately positions the developing roller 12 relative to the photosensitive drum 31. The slope surface included in the second guide surface 45 smoothly guides the developing roller 12 between the first guide surface 44 and the second guide surface 45.

In the manner described above, the developer cartridge 1 is appropriately positioned relative to the drum unit 3 when the developer cartridge 1 is attached to the drum unit 3. At this position, the lock lever 48 is at the lock position. The developer cartridge 1 thus does not easily separate from the drum unit 3 under vibrations or impact applied to the image forming apparatus 100. The structure according to the present embodiment enables reliable attachment and removal of the developer cartridge 1 to and from the drum unit 3.

What is claimed is:

1. A developing cartridge comprising:

a housing configured to contain toner, the housing having a first outer surface, a second outer surface located away from the first outer surface in a first direction, a third outer surface and a fourth outer surface located away from the third outer surface in a second direction;

a developing roller rotatable about a roller axis extending in the first direction, the developing roller located at the third outer surface of the housing;

a coupling located at the first outer surface of the housing, the coupling being rotatable about a coupling axis extending in the first direction, the coupling having a recess recessed in the first direction and exposed outside the first outer surface of the housing;

a boss protruding from the first outer surface of the housing in the first direction, the boss being located away from the developing roller in the second direction and a third direction; and a pressure receiving surface located farther away from the developing roller than the boss is from the developing roller in the second direction, the pressure receiving surface being positioned at the fourth outer surface of the housing, the pressure receiving surface being configured to receive a pressing force in the second direction from a pressing member of a drum unit, wherein the fourth outer surface of the housing has a first surface and a second surface which is positioned closer to the developing roller than the first surface is to the developing roller in the second direction, the pressure receiving surface being positioned at the second surface, and wherein the boss is located between the coupling and the pressure receiving surface in the second direction.

2. The developing cartridge according to claim 1, wherein the pressure receiving surface is configured to receive the pressing force in the second direction from the pressing member of the drum unit in a case where the developing cartridge is attached to the drum unit.

3. The developing cartridge according to claim 1, wherein the boss has an arcuate-shaped surface.

4. The developing cartridge according to claim 3, wherein the boss is cylindrical.

5. The developing cartridge according to claim 1, wherein the boss is integrally formed with the housing.

6. The developing cartridge according to claim 1, wherein the developing roller has an uncovered surface located at a first end of the developing roller in the second direction and exposed outside the housing, and a covered surface located at a second end of the developing roller in the second direction and located inside the housing, the second direction crossing the first direction and the third direction.

7. The developing cartridge according to claim 1, wherein the boss is configured to bear a weight of the developing cartridge.

8. The developing cartridge according to claim 1, wherein the developing cartridge is attachable to the drum unit including a photosensitive drum, and wherein the boss is configured to bear a weight of the developing cartridge in a state where the boss is supported by the drum unit.

9. The developing cartridge according to claim 8, wherein the developing cartridge is configured to pivot about the boss in the state where the boss is supported by the drum unit.

10. The developing cartridge according to claim 1, wherein the first direction crosses the second direction and the third direction, and the second direction crosses the third direction.

11. The developing cartridge according to claim 10, wherein the second direction is perpendicular to the third direction, and the first direction is perpendicular to both the second direction and the third direction.

* * * * *